United States Patent [19]
Honma et al.
[11] Patent Number: 4,904,334
[45] Date of Patent: Feb. 27, 1990

[54] APPARATUS FOR COLOR HIGHLIGHTING

[75] Inventors: Shigeo Honma; Kazuyoshi Hara, both of Osaka, Japan

[73] Assignee: Minolta Camera Kabushiki Kaisha, Osaka, Japan

[21] Appl. No.: 159,293

[22] Filed: Feb. 23, 1988

[30] Foreign Application Priority Data

Feb. 27, 1987 [JP] Japan .................................. 62-45797

[51] Int. Cl.[4] .......................... B44C 1/17; B32B 31/00

[52] U.S. Cl. .................................... 156/540; 156/234; 156/238; 156/365

[58] Field of Search ............... 156/230, 233, 238, 361, 156/365, 391, 475, 540, 541, 574, 573, 579, 582, 583.1, 584, DIG. 48, DIG. 51, 234, 241, 483; 101/27, 33, 34, 149.4; 237/12

[56] References Cited

U.S. PATENT DOCUMENTS

| | | | |
|---|---|---|---|
| 1,134,227 | 4/1915 | Reindel | 156/577 |
| 1,136,497 | 4/1915 | Swallow | 156/577 |
| 3,088,402 | 5/1963 | Newman | 101/149.4 |
| 3,321,353 | 5/1967 | Zelnick | 156/583.1 |
| 3,380,874 | 4/1968 | Berman | 156/577 |
| 3,586,587 | 6/1971 | Boyce | 156/577 |
| 3,815,494 | 6/1974 | Bahumüller | 101/27 |
| 4,006,267 | 2/1977 | Kurz | 427/56 |
| 4,048,913 | 9/1977 | Navi | 101/27 |
| 4,174,249 | 11/1979 | Bopst, III | 156/577 |
| 4,624,733 | 11/1986 | Hamisch, Jr. | 156/DIG. 48 |
| 4,718,971 | 1/1988 | Summers | 156/577 |

*Primary Examiner*—David Simmons
*Assistant Examiner*—Louis Falasco
*Attorney, Agent, or Firm*—Wenderoth, Lind & Ponack

[57] ABSTRACT

An apparatus for color highlighting an image portion of a photocopy including a housing provided with a storage compartment for storing a roll of transfer material and an opening for extraction of the leading end of the transfer material. A pressure member is disposed in the housing in the proximity of the opening and adapted to exert pressure or heat and pressure on the transfer material being extracted and permit transfer of part of the transfer material onto a surface of a photocopy for receiving the transfer material. A pair of guiding members prevent the transfer material from contacting the pressure member when the apparatus is not in the state of operation. In operation, the action of extraction of the transfer material and the action of exertion of pressure are accomplished by the movement of the housing.

5 Claims, 6 Drawing Sheets

APPARATUS FOR COLOR HIGHLIGHTING

BACKGROUND OF THE INVENTION

1. Field of the Invention

This invention relates to an apparatus for color highlighting. More particularly, it relates to a simple transfer apparatus for color developing a pattern or an image, for example by a simple procedure on a laminate transfer sheet.

2. Description of the Prior Art

The idea of producing a color image by causing part of a laminate sheet to be transferred onto a pattern or an image has been known to the art. Methods for effecting this transfer have been disclosed in U.S. Pat. Nos. 3,088,402 and 4,006,267, for example. These methods of transfer generally comprise fitting a laminate sheet on an object for reception of a transferred image by means of a fixing roll or iron of a laminator or copying machine. The laminate sheet is manufactured by forming on a base film (A) such as of polyethylene terephthalates a release layer (B) of waxy resin by the gravure printing technique, forming on the release layer (B) a colored layer (C) produced by preparing a mixture composed of resin, solvent, dye, and pigment and adjusted to a specified color, applying the mixture with a gravure machine, and drying the applied coat of the mixture by heating, optionally forming on the colored layer (C) an aluminum layer (D) produced by the vacuum evaporation of aluminum, and further forming on the aluminum layer (D) an adhesive layer (E) produced by the deposition of adhesive agent.

The conventional methods of transfer which are based on the operating principle described above effect the transfer by superposing a laminate sheet on an image-carrying fabric or paper and applying heat or pressure thereon with a heating or pressing device. In either of the methods, therefore, the works involved are complicated. Where a colored image is desired to be produced by partial transfer as onto a New Year's postcard, for example, there is generally employed a practice of fixing a piece of laminate sheet cut to a suitable size on the relevant portion of the postcard as with adhesive tape and then thermocompressing the laminate sheet on the postcard. In this case, the works involved are further complicated.

An object of the present invention, therefore is to provide an improved apparatus for color highlighting.

Another object of this invention is to provide an apparatus for color highlighting which produces a color picture of a pattern or an image by a simple procedure on a laminate transfer sheet.

SUMMARY OF THE INVENTION

The objects described above are accomplished by an apparatus for color highlighting an image portion of a photocopy produced by a photocopy machine comprising housing provided with storage chamber for storing a roll of transfer material and an opening for extracting the transfer material from the roll and a pressure member disposed on the housing in the proximity of the opening and adapted to exert pressure on the transfer material being extracted and effect partial transfer of the transfer material, wherein the action of extracting the transfer material and the action of exerting pressure are generated by moving the housing.

The apparatus for color highlighting according to the present invention effects transfer by extracting the transfer material held inside the storage chamber out of the opening, opposing the extracted portion of the transfer material to an object for reception of an image, and moving the housing as pressed against the transfer material. These steps for transfer, therefore, can be easily carried out manually at any desired part. Since the part for transfer can be selected at will, partial coloration with a plurality of colors can be easily attained.

BRIEF DESCRIPTION OF THE DRAWINGS

FIG. 1 represents a longitudinal cross section of the apparatus in the direction of the front side, FIG. 2, is a front view of the apparatus in a state having the front frame removed, FIG. 3 is a perspective view of the pressure member of the apparatus, FIG. 4 is a magnified view illustrating the state in which pressure members are interchanged, FIGS. 5 and 6 each represent a longitudinal cross section of the apparatus in the direction of the front side illustrating a different state assumed during the course of transfer.

DESCRIPTION OF THE PREFERRED EMBODIMENT

Now, the apparatus for color highlighting as typical embodiments of the present invention will be described below with reference to the accompanying drawings.

Figure 1:
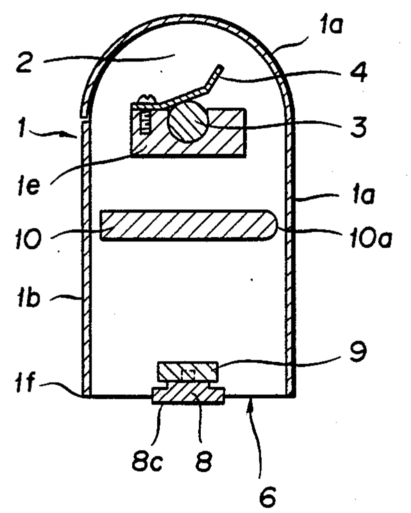
FIGS. 1 to 6 pertain to a simple transfer apparatus as a first embodiment of this invention.
Figure 2:
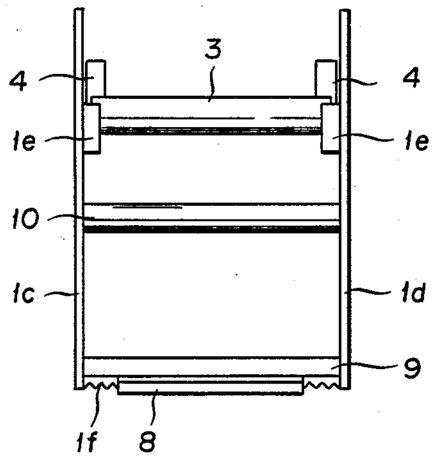

The apparatus for color highlighting as the first embodiment of this invention is suitable where a laminate sheet is used which effects transfer by mere application of pressure. This apparatus, as illustrated in Figs. 1 and 2, comprises a housing 1 and a pressure member 8.

Figure 5:
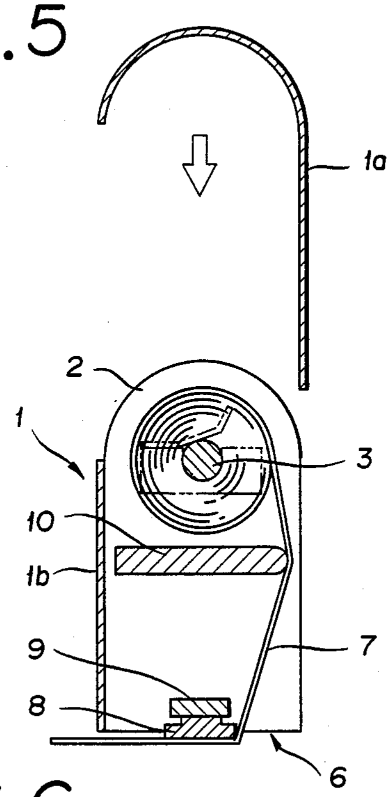

The housing 1 comprises a front frame 1*a*, a rear frame 1*b*, and lateral frames 1*c* and 1*d*. The front frame 1*a* is formed in a divisible state so as to facilitate attachment and detachment of a roll of transfer material (not shown), with the upper portion thereof arched. At an upper position in the interior of the housing 1, a storage chamber 2 is formed for the storage of a roll of transfer material 7 (FIG. 5). At the center of the storage chamber 2, a rotary shaft 3 for supporting the transfer material 7 is detachably disposed. This rotary shaft is rotatably attached to the housing 1 by having the opposite ends thereof fitted into a supporting member le fixed to the housing 1. This supporting member le is provided thereon with a retaining spring 4 adapted to keep the rotary shaft 3 constantly urged against the supporting member and control the rotation of the rotary shaft 3. The lower end of the housing 1 can be uncovered to form a complete opening. The rear frame 1*b* is provided at the lower end thereof with a serrated cutting member 1*f*, for example, which serves the purpose of cutting the used portion of the transfer material 7. This cutting member 1*f* is made separately of the rear frame 1*b* and attached thereto at the time of assembly where the rear frame 1*b* is made of a plastic material. The cutting member is molded monolithically, or otherwise, with the rear frame 1*b* where the rear frame 1*b* is made of a metallic material.

Figure 3:
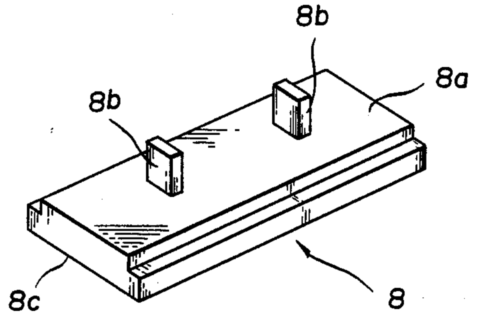
Figure 4:
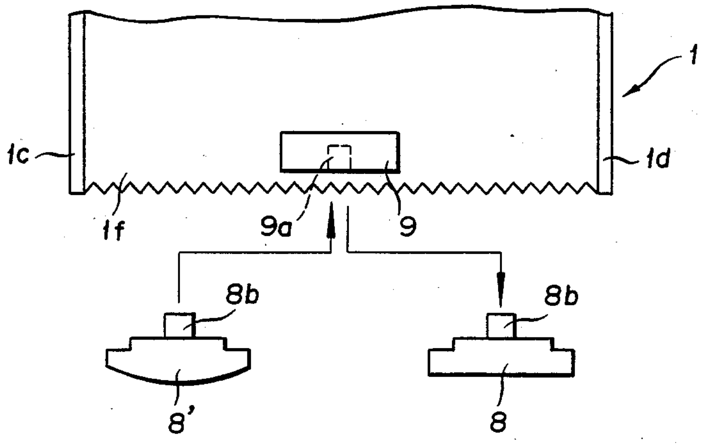

The pressure member 8 comprises a main body 8*a* having a length slightly greater than the width of the transfer material 7 and two fitting members 8*b* and 8*b* protruding from the main body 8*a* as illustrated in FIG. 3. This pressure member 8 is detachably attached to the housing 1 by having the fitting members 8*b* and 8*b* thereof fit fast into recesses 9*a* and 9*b* formed in a supporting member 9 interconnecting the lateral frames 1*c* and 1*d* of the housing 1. The pressure member 8 is provided on the side opposite the fitting member 8*b* with a flat pressing surface 8*c* formed with fluorine resin (a product marketed under the trademark designation of "Teflon"). This pressure member 8 is disposed so that the pressing surface 8*c* slightly protrudes from the opening 6 of the housing 1. The transfer member 7 is led to the lower portion of the pressure member 8 through one of the two portions of the opening 6 divided equally by the pressure member 8 which falls on the side opposite the cutting member 1*f*. Optionally, the pressure member 8 may be rendered interchangeable by providing the apparatus with another pressure member 8' which possesses a fitting part 8*b* perfectly identical in shape with the fitting part 8*b* of the pressure member 8 and an outwardly curved pressing surface 8*c* as illustrated in FIG. 4.

Further inside the housing 1, a guide member 10 provided at one end thereof with a guide part 10*a* possessing a curved surface is disposed across, the interior of the housing 1 as fastened by the free ends thereof to the lateral frames 1*c* and 1*d*. The guide member 10 serves to enable the transfer material 7 to be guided easily to the opening 6 in the housing 1. The guide member 10 need not be shaped like a plate but may be of the shape of a bar circular or elliptical in cross section. When it is in the shape of a bar having a circular cross section, it may be rotatably attached to the lateral frames 1*c* and 1*d*.

The apparatus of the present embodiment is constructed as described above. Now, the use of this apparatus in effecting transfer onto a toner image formed on a copy paper with an electrophotographic machine will be described below. The transfer material may be of any of the conventional types such as, for example, a laminate sheet. The laminate sheet may be a metallic foil laminate sheet which is obtained by forming a release layer (B) of waxy resin by the gravure coating technique on a base film (A) such as of polyethylene terephthalate, forming on the release layer (B) a colored layer (C) produced by preparing a mixture composed of resin, solvent, dye, and adjusted to a prescribed color, applying on the surface with a gravure machine, and drying the applied coat of the mixture by application of heat, forming on the colored layer (C) a metallic layer (D) by vacuum evaporation of aluminum of high purity of 99.99%, for example under a high degree of vacuum in the range of 0.0001 to 5 mmHg at a temperature of about 1,600° C., and forming on the metallic layer (D) an adhesive layer (E) by coating the metallic layer (D) with adhesive agent fitting an object for transfer and excelling in thermosensitivity and pressure sensitivity. In this case, by varying the material to be used for the metallic layer (D), the laminate sheet to be produced will have a pigment foil, a print foil (wood grain foil, or multi-color print transfer foil), blocking foil genuine gold foil, chromium foil, transparent foil, pearl foil, or ink foil, for example.

Figure 6:
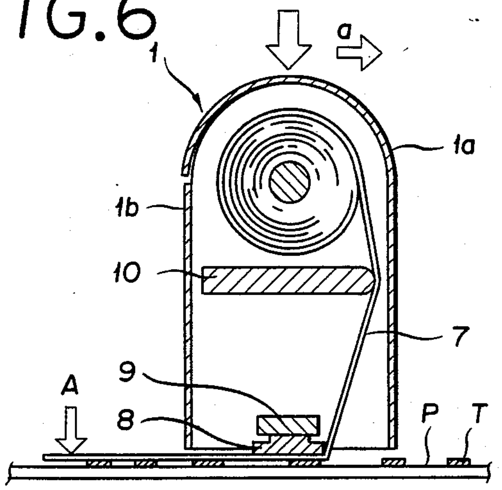

First, the front frame 1*a* is removed from the housing and desired transfer material is wound up in a roll on the rotary shaft 3 and set in the storage chamber 2 as illustrated in FIG. 5. Then, the leading end of the transfer material 7 is pulled out along the opening 6. The adhesive layer side of the transfer material is opposed to the portion of desired toner image T of the copy paper P serving as a object for transfer. Then, the housing 1 is disposed so that one end portion of the toner image T approximately coincides with the pressure member 8. Then, as illustrated in FIG. 6, the leading end portion A of the transfer material 7 is held fast in position with one hand and the entirety of the housing 1 is pressed in the direction of the copy paper P and, at the same time, moved over the desired toner image T away from the leading end of the transfer material 7 in the direction of the arrow a with the other hand As the result, the transfer material 7 is pressed against the toner image and is caused to adhere fast to the desired portion of the toner image T by the pressure member 8. In consequence of the pressed contact, the solvent retained on the surface of the transfer material 7 is absorbed by the toner and the toner is softened and caused to acquire viscidity. Owing to the viscidity possessed by the toner image T, the portion of the transfer material 7 which is pressed against the toner image T is made to adhere fast to the toner image T. As the housing 1 is moved in the direction of the arrow a, the transfer material 7 stored as rolled inside the storage chamber 2 is rotated and pulled out by a length equalling the distance of the motion of the housing 1 and is opposed to the toner image T. When the transfer material 7 is pulled apart from the copy paper P by the motion of the housing 1, only the portion of the transfer material 7 which adheres fast to the toner image T is left sticking to the surface of the toner image T. Thus, the transfer is effected. Since the retainer spring 4 exerts a proper load through the medium of the rotary shaft 3 upon the transfer material 7 being pulled out by the motion of the housing 1, the transfer material 7 neither gathers any wrinkle nor sags inside the housing 1 by virtue of the inertia when is generated when the motion of the housing 1 is suddenly stopped.

With the simple transfer apparatus as the first embodiment of the present invention, the work of color highlighting a given image by the transfer of the transfer material can be very easily carried out manually as described above.

Figure 7:
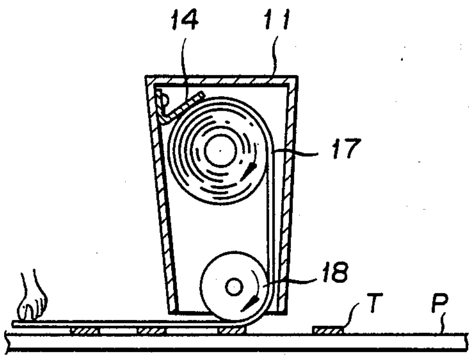
FIG. 7 is a longitudinal cross section illustrating another simple transfer apparatus as a second embodiment of the present invention in the direction of the front side.

FIG. 7 illustrates another simple transfer apparatus as the second embodiment of this invention. In this apparatus, a pressure member 18 is formed in a tubular shape and rotatably supported within a housing 11. A retainer spring 14 is fixed to the housing 11 and is adapted to control the rotation of a transfer material by being held in contact with the transfer material 17.

Figure 8:
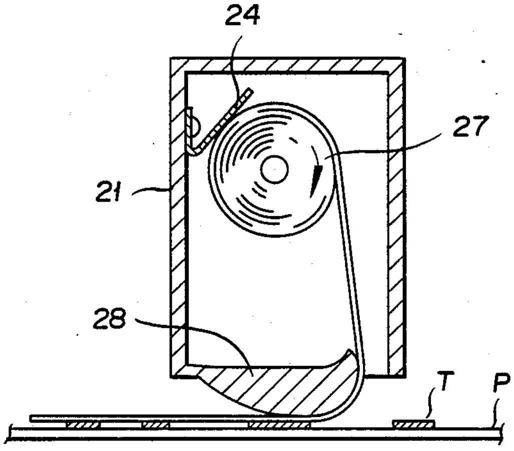
FIG. 8 is a longitudinal cross section illustrating yet another simple transfer apparatus as a third embodiment of the present invention in the direction of the front side, FIGS. 9 to 12 pertain to an apparatus as a fourth embodiment of the present invention.

FIG. 8 illustrates yet another simple transfer apparatus as the third embodiment of the present invention. In this apparatus, a pressure member 28 is resiliently retained on a housing 21. In this case, the pressure member 28 may be integrally formed with the housing 21 or may be formed separately of the housing 21 and subsequently fixed thereto through the medium of springs, for example. A retainer spring 24 is constructed similarly to the countertype in the second embodiment so as to control the rotation of a transfer material 27.

Figure 9:
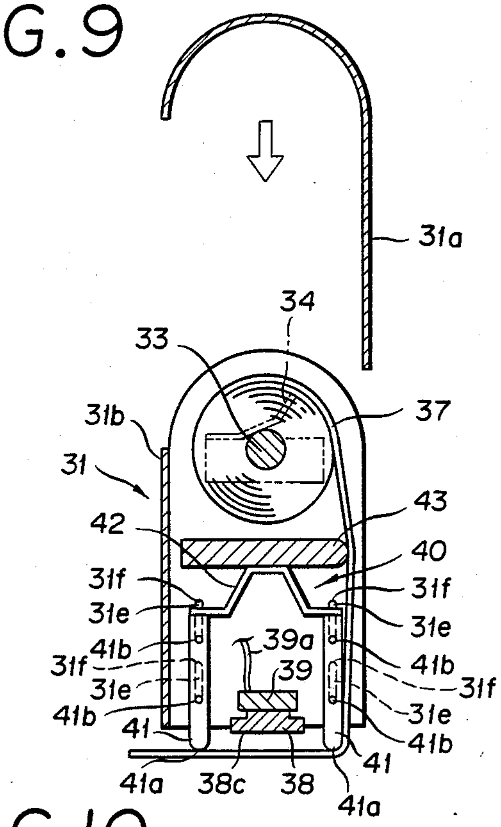
FIG. 9 represents a longitudinal cross section illustrating the apparatus in the direction of the front side.
Figure 10:
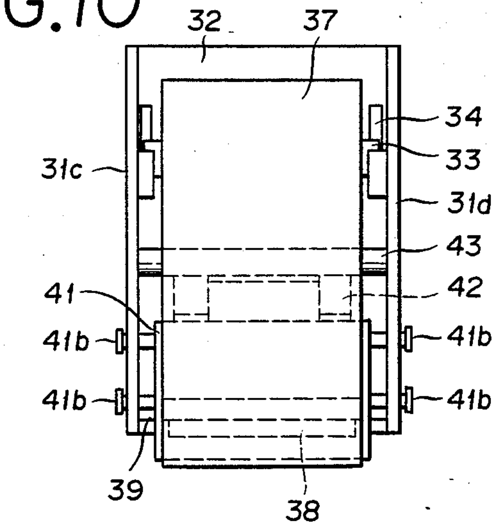
FIG. 10 is a front view of the apparatus.

Still another simple transfer apparatus as the fourth embodiment of the present invention is useful where there is used as transfer material of the type of laminate sheet, for example, which effects transfer simply by application of heat and pressure. This simple transfer apparatus, as illustrated in FIGS. 9 and 10, comprises a housing 31 composed of a front frame 31*a*, a rear frame 31*b*, and lateral frames 31*c* and 31*d*, a pressure member 38, a guide member 43, and a control member 40. It is approximately equal in construction to the simple transfer apparatus of the first embodiment, except for the pressure member 38 and the control member 40.

The housing or storage member 31 is provided therein with a storage chamber 32 for storing a transfer material (laminate sheet) 37, a rotary shaft 33 supporting the transfer material 37, and a retainer spring 34 for controlling the rotation of the rotary shaft 33.

The pressure member 38 comprises a main body formed with a heat member and being slightly wider than the width of the transfer material 37 and a pair of fitting members 38*b* (FIG. 3) serving concurrently as electrodes. The pressure member 38 is detachably attached to a support member 39 interconnecting the lateral frames 31*c* and 31*d* of the housing 31 through the medium of the fitting member 38*b*. As a heat source for the main body of the pressure member 38, a heat generator (product of Kabushiki Kaisha Murata Seisakusho and marketed under the trademark designation of "Posister") is used. By controlling the power supply, this heat generator is heated to a temperature in the range of 70° to 200° C. The pressure member 38 is provided on the side thereof opposite the fitting members 38*b* with a flat pressing surface 38*c* of fluorine resin (marketed under the trademark designation of "Teflon"). The pressure member 38 is so disposed that the pressing surface 38*c* slightly protrudes from an opening 36 of the housing 31. To the support member 39*a*, a cord 39 for supply of electricity to the heat generator is attached at one end thereof. The cord is connected at the other end to a power source (not shown). The pressure member 38 may be adapted to be interchangeable with another pressure member similarly to the first embodiment described above.

The control member 40 comprises a pair of guiding members 41 opposed to each other on either side of the pressure member 38 and the leaf spring or urging member 42 fixed on a guide member 43 and adapted to project the guiding members 41 downwardly. Each of the guiding members 41 is formed in the shape of a plate. The leading end 41*a* of one of the plate-shaped guiding members 41 is curved. The guiding members 41 are provided on the opposite lateral surfaces thereof with pins 41*b*, which are kept in engagement with oblong holes 31*e* bored in the lateral frames 31*c* and 31*d* of the housing 31. By the pins 41*b* and the oblong holes 31*e*, the range in which the guiding members 41 are allowed to move relative to the housing 31 is controlled. The guiding members 41 are disposed so that, by being urged with the leaf spring 42, the guiding members 41 are allowed to have the leading end surfaces 41*a* thereof to protrude slightly from the opening

36 of the housing 31 farther than the pressing surface 38*c*. When the guiding members 41 are pressed enough to overcome the urging force of the leaf spring 42 and, consequently, the pins 41*b* collide against one end 31*f* of the oblong holes 31*e*, the leading end surfaces 41*a* of the guiding members 41 substantially fall flush with the pressing surface 38*a* of the pressure member 38. The transfer material 37 held inside the storage chamber 32 is extracted through the opening intervening between the front frame 31*a* and the guiding members 41.

Figure 11:
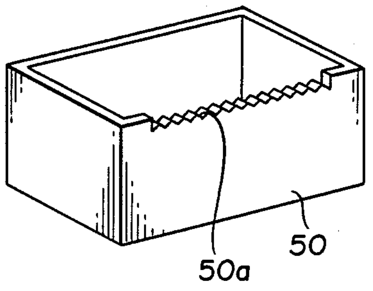
FIG. 11 is a perspective view of a cap.
Figure 12:
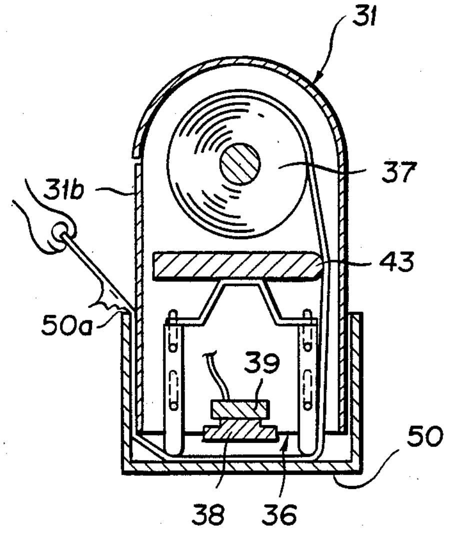
FIG. 12 is a longitudinal cross section illustrating the simple transfer apparatus provided with the cap in the direction of the front side.

Optionally, the simple transfer apparatus may be provided with a protective cap 50 which is adapted, as illustrated in FIGS. 11 and 12, to be slipped over the opening 36 side of the housing 31. In the open end portion of the rear frame 31*b* side of this cap 50, there is formed a serrated cutting portion 50*a* serving to cut the used portion of the transfer material.

The simple transfer apparatus of the fourth embodiment is constructed as described above. With this simple transfer apparatus similarly to that of the first embodiment described above, the work of transfer is carried out manually. In this case, by the thermocompression of the pressure member 38, the toner forming an image on the copy paper is melted and allowed to acquire viscidity. Consequently, the portion of the transfer material 37 which is held in pressed contact with the toner image is transferred by virtue of the viscidity. At any time that the transfer is not proceeding, the portion of the transfer material 37 which is extracted through the opening 36 in the housing 31 is kept apart from the heated pressure member 38 by the control member 40.

While the present invention has been described with reference to the foregoing embodiments, many changes and modifications may be made thereto which fall within the scope of the appended claims.

What is claimed is:

1. An apparatus for color highlighting an image portion of a photocopy comprising:

a housing provided with a storage compartment for storing a roll of transfer material and an opening for extraction of one end of said transfer material in a moving direction;

a pressure member attached to said housing for exerting pressure and heat on the transfer material being extracted from said storage compartment through the opening to transfer a part of the transfer material onto the surface of a photocopy for receiving the transfer material;

a first guiding member disposed upstream of said pressure member as viewed in the moving direction of the transfer material;

a second guiding member disposed downstream of said pressure member as viewed in the moving direction of the transfer material, said first and second guiding members protruding past a pressure surface of said pressure member and adapted to prevent the transfer material from contacting said pressure member while the apparatus is not in operation; and an urging member disposed resiliently relative to said housing and said pressure member for urging said guiding member in a direction in which they protrude past said pressure surface thereby to prevent the transfer material from contacting said pressure member while the apparatus is not in operation.

2. An apparatus according to claim 1, wherein said transfer material is fixed to a rotary shaft which is supported at free ends thereof by opposite lateral frames of said housing.

3. An apparatus according to claim 2, wherein said housing has a top portion which is openable.

4. An apparatus according to claim 3, wherein said housing comprises a rear frame, said opposite lateral frames, and a front frame provided with said top portion, and said front frame is detachable from other component parts of said housing.

5. An apparatus for color highlighting an image portion of a photocopy comprising:

a storage member for storing a roll of transfer material;

a pressure member attached to said storage member for exerting pressure and heat on the transfer material being extracted, in a moving direction, from said storage member to transfer a part of the transfer material onto a surface of the photocopy for receiving the transfer material;

a first guiding member disposed upstream of said pressure member as viewed in the moving direction of the transfer material;

a second guiding member disposed downstream of said pressure member as viewed in the moving direction of the transfer material, said first and second guiding member protruding resiliently past a pressure surface of said pressure member and adapted to prevent the transfer material from contacting said pressure member while the apparatus is not in operation; and an urging member having a property of resilience for urging said guiding members past said pressure surface thereby to prevent the transfer material from contacting said pressure member while the apparatus is not in operation.

* * * * *